(12) United States Patent
Bowser

(10) Patent No.: US 9,944,458 B2
(45) Date of Patent: Apr. 17, 2018

(54) MODULAR SHIPPING CONTAINER HAVING HINGED DOORS, SYSTEM, AND METHOD

(71) Applicant: Bruce Douglas Bowser, Mississauga (CA)

(72) Inventor: Bruce Douglas Bowser, Mississauga (CA)

( * ) Notice: Subject to any disclaimer, the term of this patent is extended or adjusted under 35 U.S.C. 154(b) by 358 days.

(21) Appl. No.: 14/728,083

(22) Filed: Jun. 2, 2015

(65) Prior Publication Data

US 2016/0145040 A1    May 26, 2016

Related U.S. Application Data

(63) Continuation-in-part of application No. 14/553,383, filed on Nov. 25, 2014.

(51) Int. Cl.
| | |
|---|---|
| *B65D 90/00* | (2006.01) |
| *B60P 1/64* | (2006.01) |
| *B65D 88/02* | (2006.01) |
| *E05C 1/04* | (2006.01) |
| *E05B 65/52* | (2006.01) |
| *B65D 88/12* | (2006.01) |
| *E05C 7/04* | (2006.01) |

(52) U.S. Cl.
CPC .......... *B65D 90/008* (2013.01); *B60P 1/6481* (2013.01); *B65D 88/022* (2013.01); *E05C 1/04* (2013.01); *B65D 88/121* (2013.01); *E05B 65/52* (2013.01); *E05C 7/04* (2013.01)

(58) Field of Classification Search
CPC ... B60P 1/6481; B65D 88/005; B65D 88/022; B65D 88/12; B65D 90/008
See application file for complete search history.

(56) References Cited

U.S. PATENT DOCUMENTS

| | | | |
|---|---|---|---|
| 2,715,040 A | 8/1955 | Rhoads | |
| 2,761,581 A | 9/1956 | Cohee | |
| 2,920,781 A | 1/1960 | Butcher et al. | |
| 3,004,682 A | 10/1961 | Bertolini et al. | |
| 3,015,407 A | 1/1962 | Fesmire et al. | |
| 3,061,134 A | 10/1962 | Fesmire et al. | |
| 3,073,466 A | 1/1963 | Greer et al. | |

(Continued)

FOREIGN PATENT DOCUMENTS

| | | | | |
|---|---|---|---|---|
| DE | 3600378 A1 | * | 7/1987 | ............. B65D 88/12 |
| DE | 3600378 C2 | * | 5/1988 | ............. B65D 88/12 |
| WO | 93/10023 A1 | | 5/1993 | |

*Primary Examiner* — Anthony Stashick
*Assistant Examiner* — Mollie Impink
(74) *Attorney, Agent, or Firm* — Renner, Otto, Boisselle & Sklar, LLP

(57) ABSTRACT

A modular shipping container, comprising: an enclosure having a base opposed and spaced from a roof, each of the base and roof coupled to respective ends of opposed and spaced left and right side walls and to opposed and spaced front and back walls, the front and back walls having front and back door openings formed therein, respectively; and, front doors and back doors mounted to the front and back walls, respectively, and operable to selectively open and close the front and back door openings; wherein the front door opening and the front doors are smaller than the back door opening and the back doors, respectively, whereby the front doors are openable at least ninety degrees through a back door opening-sized access.

13 Claims, 18 Drawing Sheets

(56) References Cited

U.S. PATENT DOCUMENTS

| | | | |
|---|---|---|---|
| 3,561,634 A | 2/1971 | Meldrum | |
| 3,593,672 A | 7/1971 | Breen et al. | |
| 3,752,349 A | 8/1973 | Rana | |
| 3,907,148 A | 9/1975 | Meller et al. | |
| 4,177,907 A | 12/1979 | Funaioli et al. | |
| 4,214,669 A | 7/1980 | McQuiston | |
| 4,819,820 A | 4/1989 | Weiner | |
| 5,052,569 A | 10/1991 | Cooper | |
| 5,192,176 A | 3/1993 | Roberts | |
| 5,199,589 A | 4/1993 | Noble | |
| 5,289,933 A | 3/1994 | Streich et al. | |
| 5,326,212 A | 7/1994 | Roberts | |
| 5,326,213 A | 7/1994 | Roberts | |
| 5,501,333 A | 3/1996 | Swan | |
| 5,601,201 A * | 2/1997 | Looker | B65D 88/005 160/273.1 |
| 5,611,449 A | 3/1997 | Pedersen | |
| 5,662,450 A | 9/1997 | Roberts | |
| 5,829,595 A | 11/1998 | Brown et al. | |
| 5,904,262 A | 5/1999 | Coppi | |
| 6,010,021 A | 1/2000 | Zuidam et al. | |
| 6,071,062 A | 6/2000 | Warhurst et al. | |
| 6,155,770 A | 12/2000 | Warhurst | |
| 6,299,008 B1 | 10/2001 | Payne | |
| 6,363,586 B1 | 4/2002 | Neufingerl | |
| 6,415,938 B1 | 7/2002 | Karpisek | |
| 6,811,048 B2 | 11/2004 | Lau | |
| 6,978,576 B2 * | 12/2005 | Shirk | E05D 3/022 220/908 |
| 7,185,779 B2 | 3/2007 | Payne | |
| 7,296,704 B2 | 11/2007 | Ferrini | |
| 7,357,611 B2 | 4/2008 | Faivre et al. | |
| 7,811,044 B2 | 10/2010 | Warhurst | |
| 8,100,279 B2 | 1/2012 | Nielsen et al. | |
| 8,128,327 B2 | 3/2012 | Jevaney | |
| 8,308,018 B2 | 11/2012 | Kochanowski | |
| 8,376,168 B2 | 2/2013 | Fielden | |
| 8,794,480 B2 | 8/2014 | Gollnick et al. | |
| 2001/0035410 A1 | 11/2001 | Taube et al. | |
| 2007/0108204 A1 | 5/2007 | Warhurst et al. | |
| 2009/0026196 A1 | 1/2009 | Leedekerken | |
| 2009/0078700 A1 | 3/2009 | Boivin | |
| 2009/0145897 A1 | 6/2009 | Chen | |
| 2010/0147842 A1 | 6/2010 | Reynard et al. | |
| 2010/0191615 A1 | 7/2010 | Thomas | |

\* cited by examiner

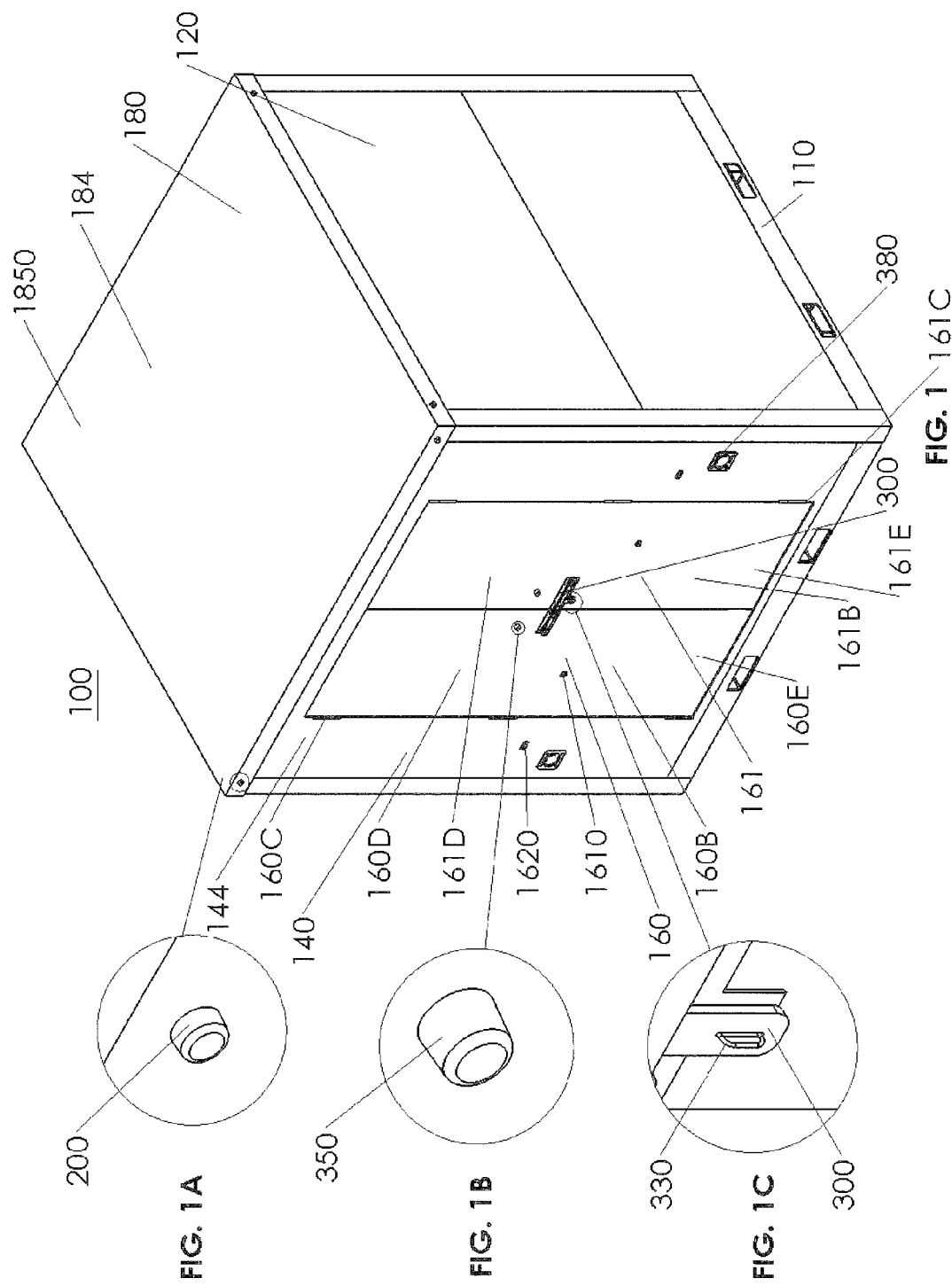

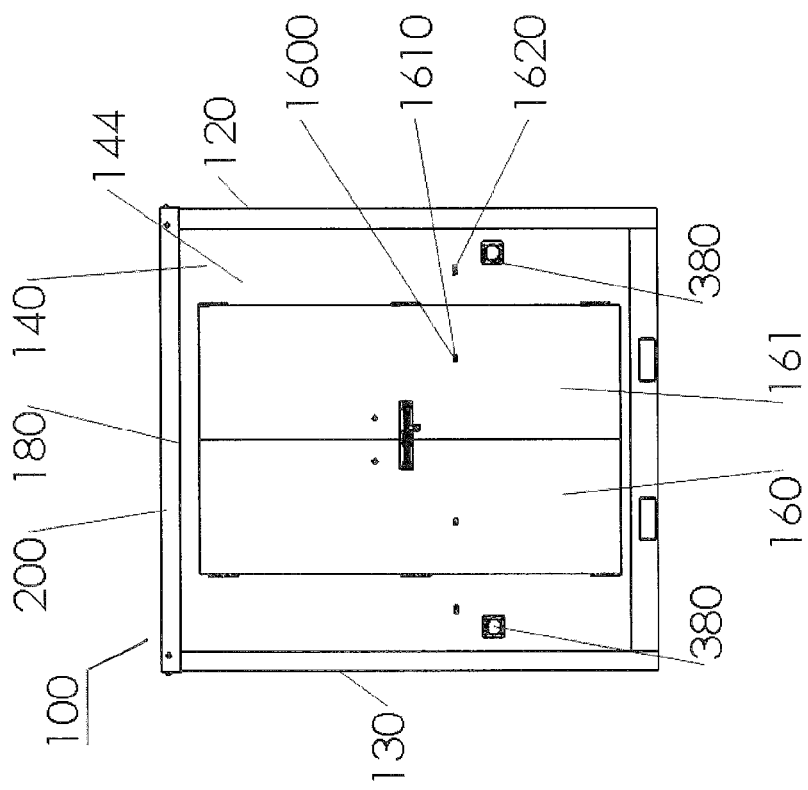
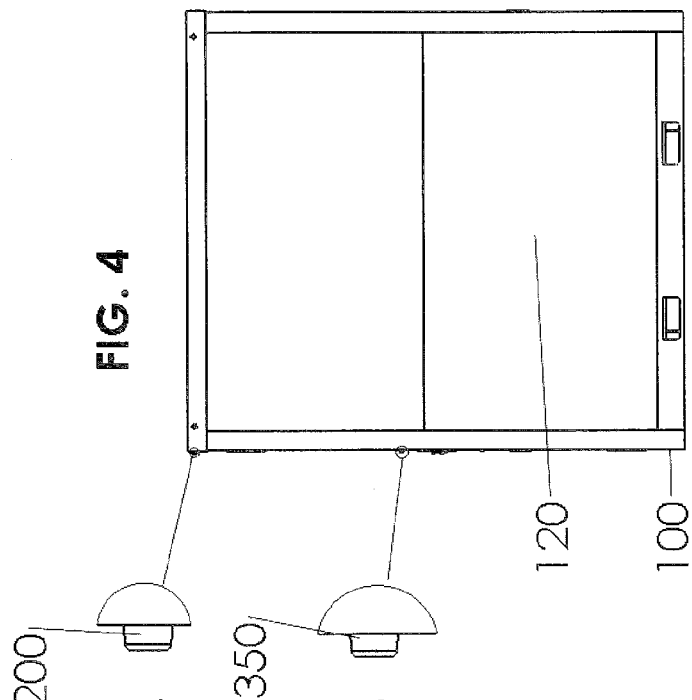

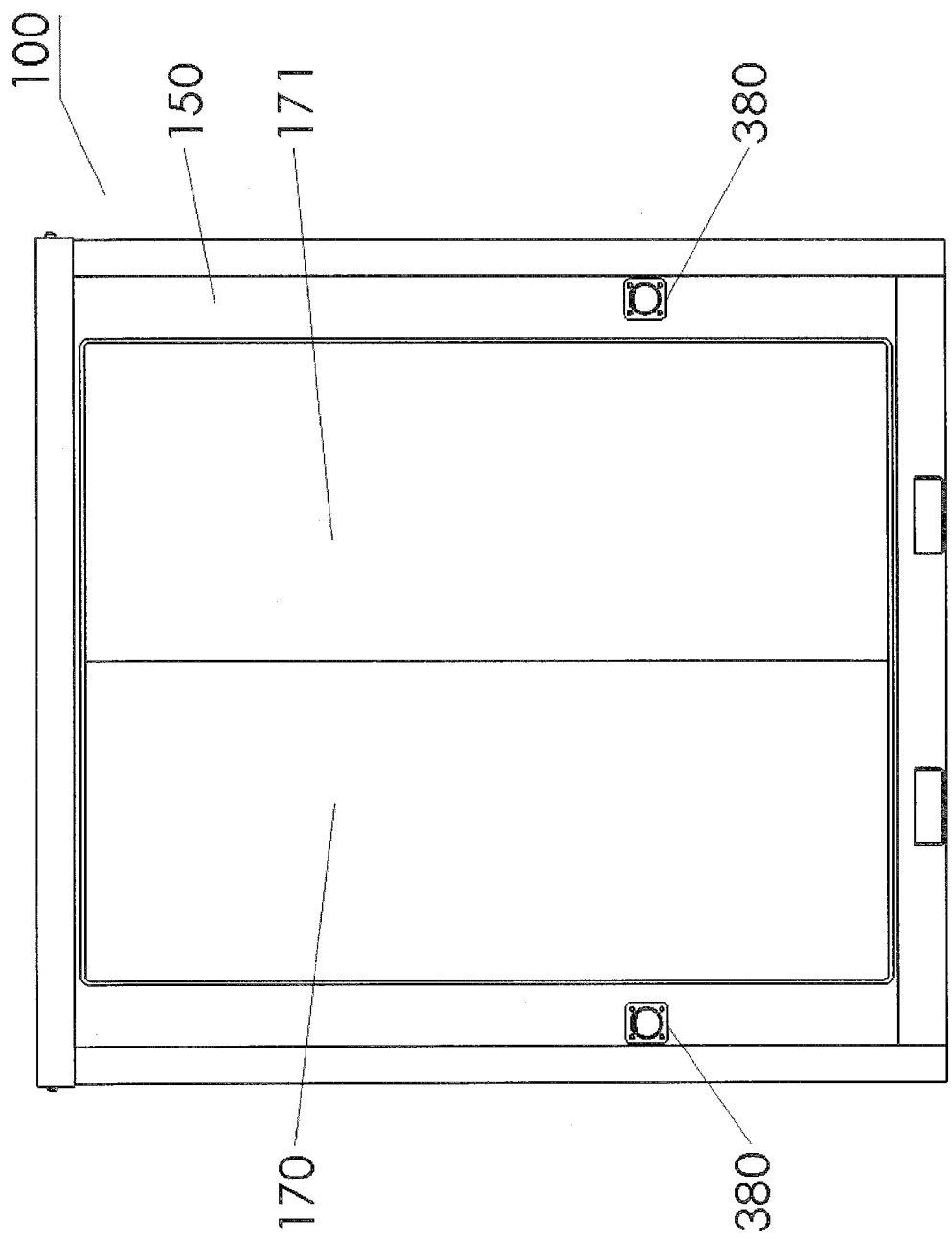

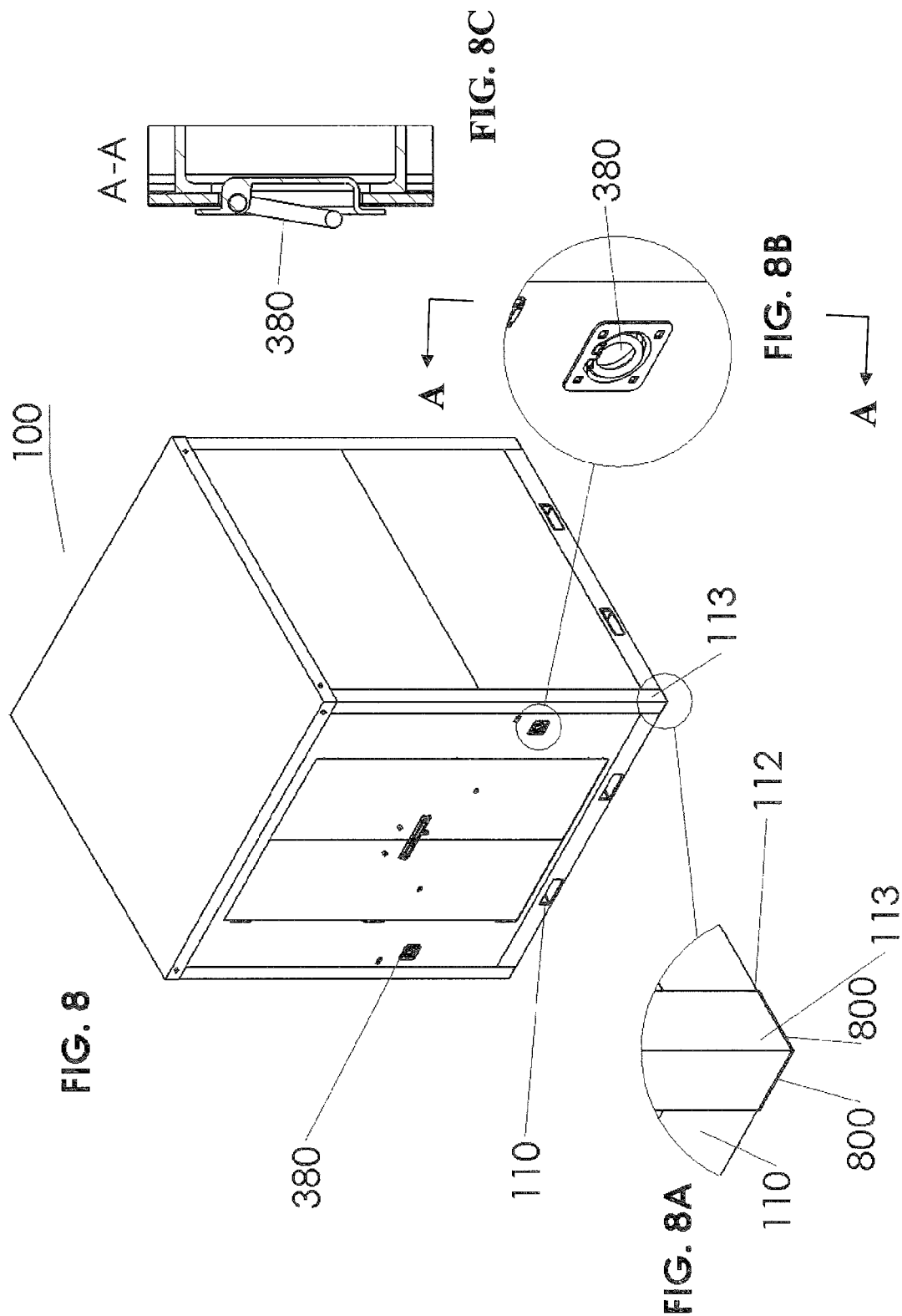

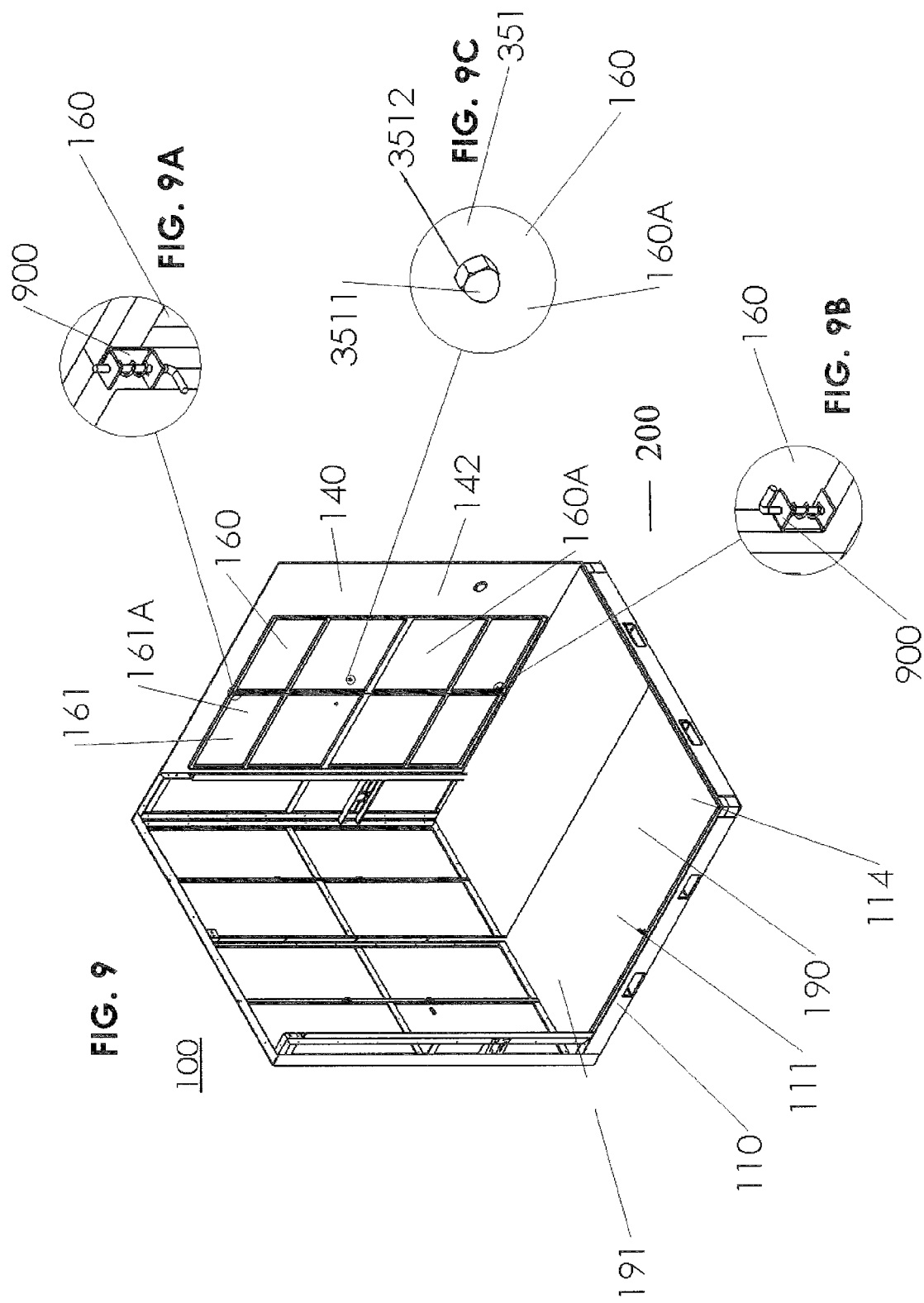

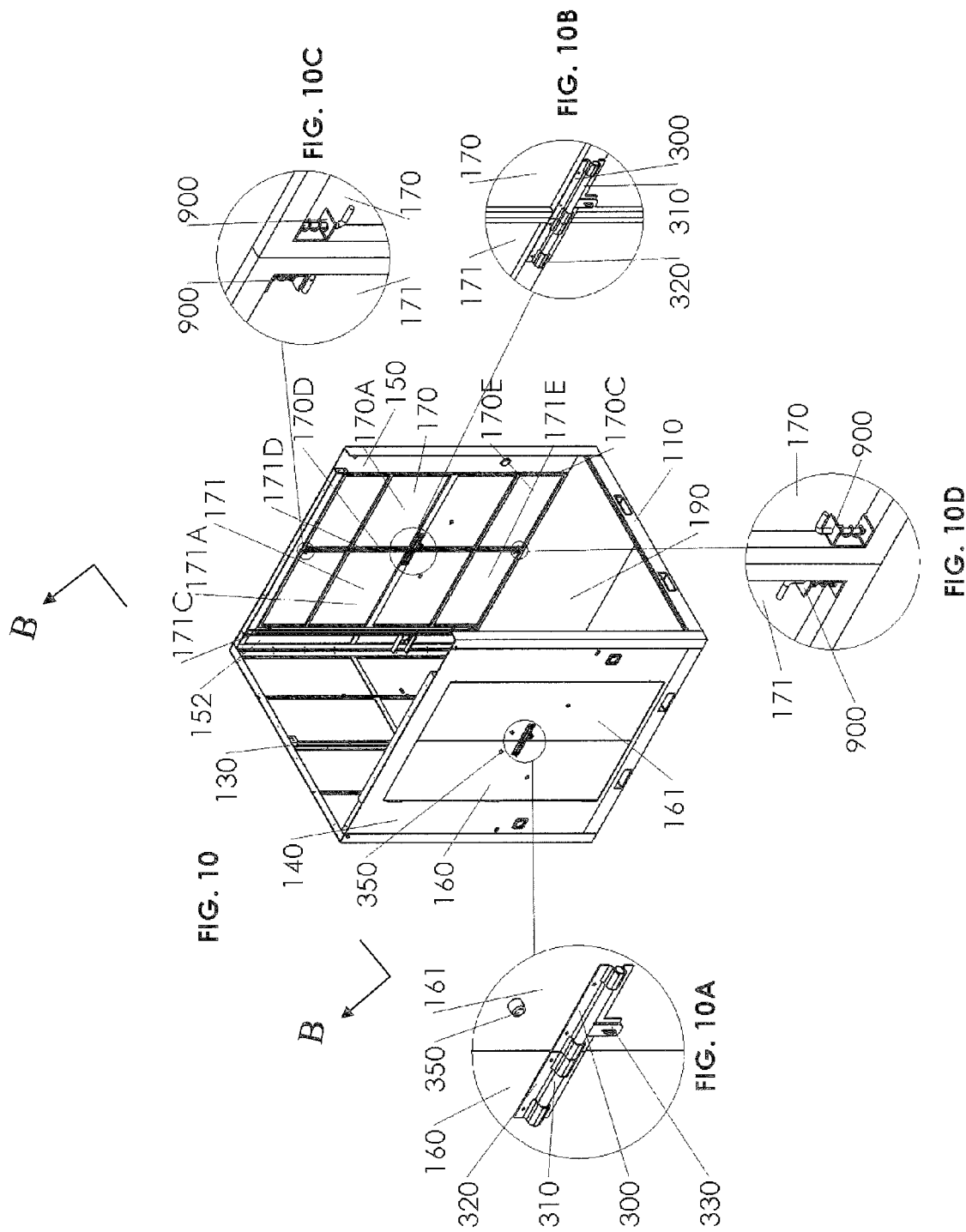

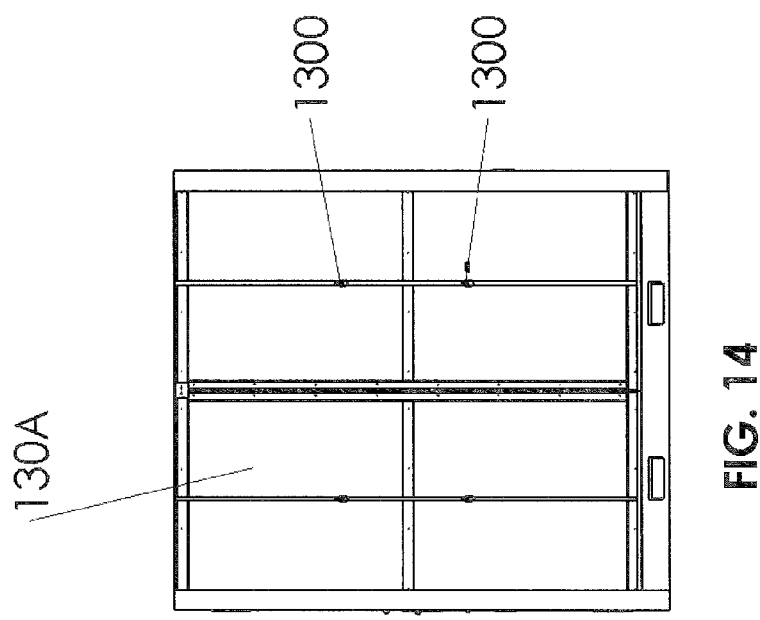
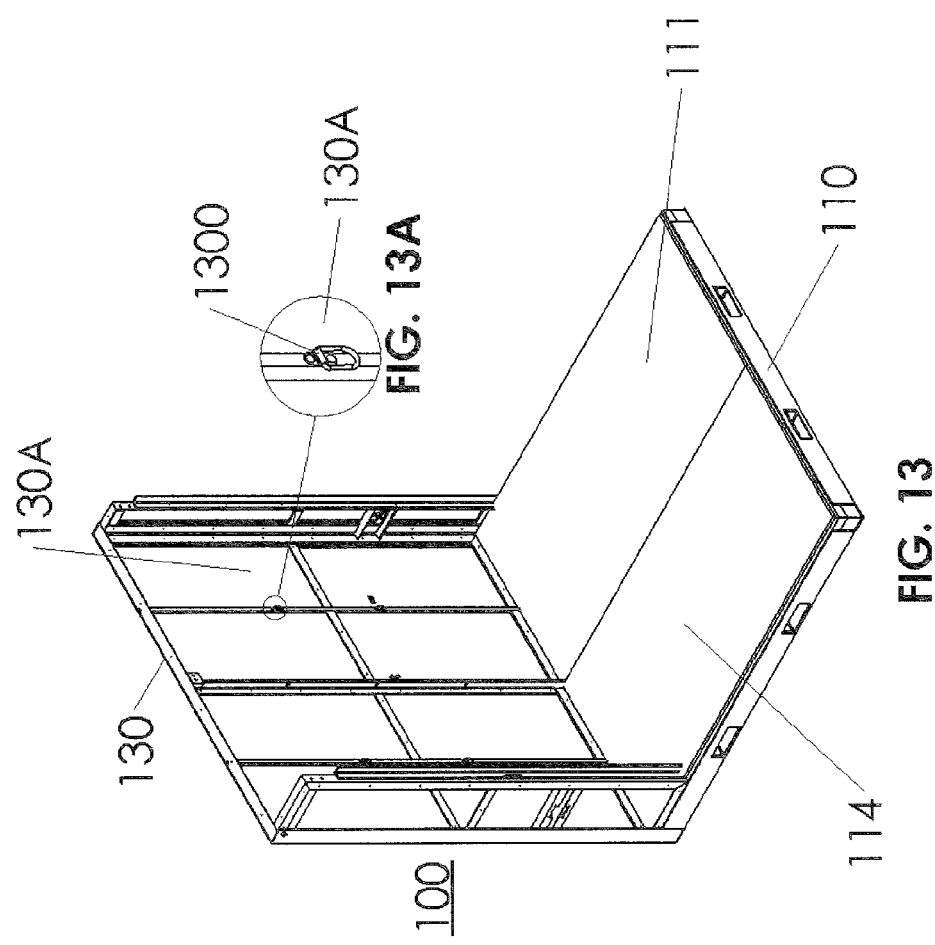

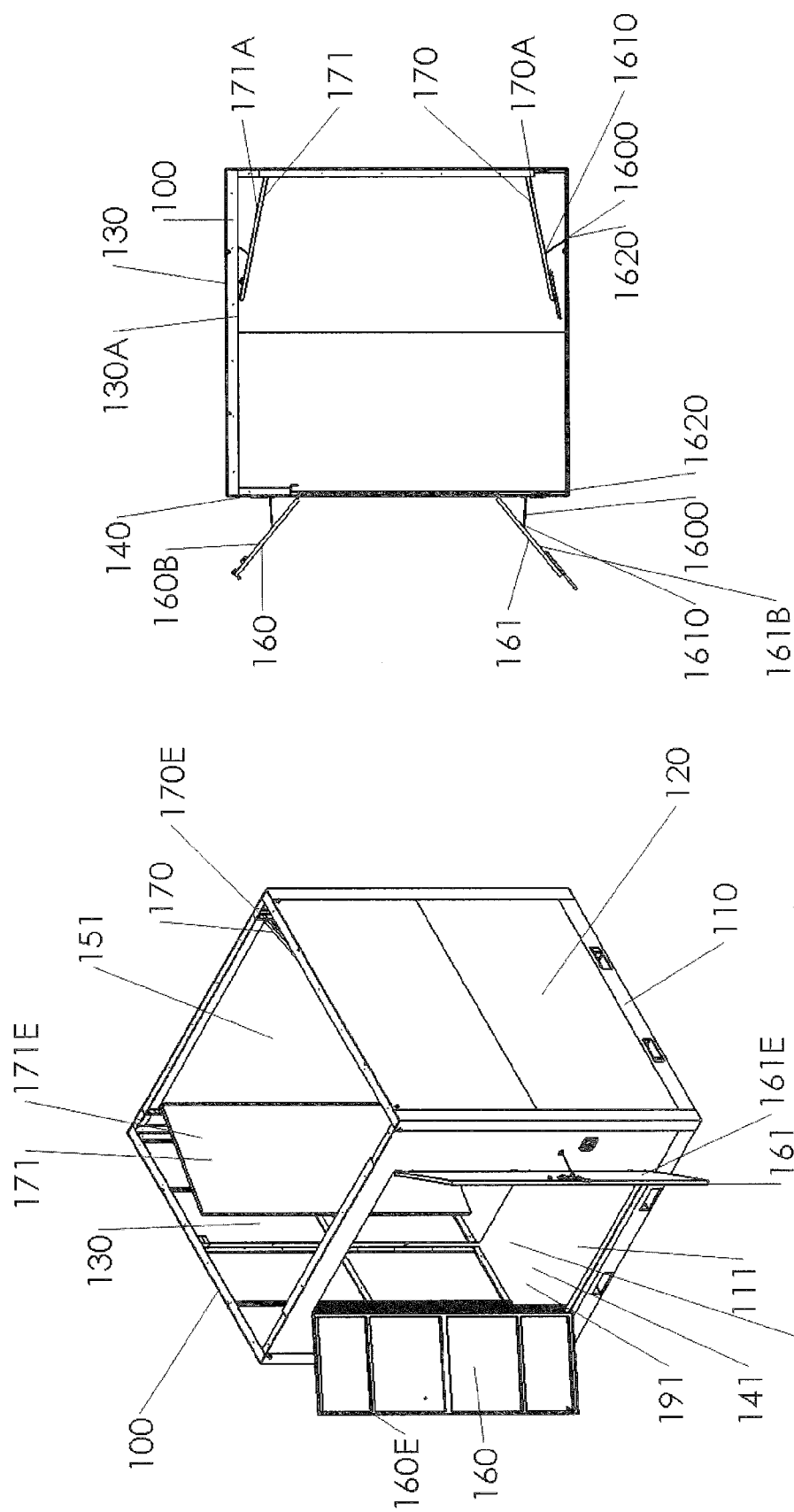

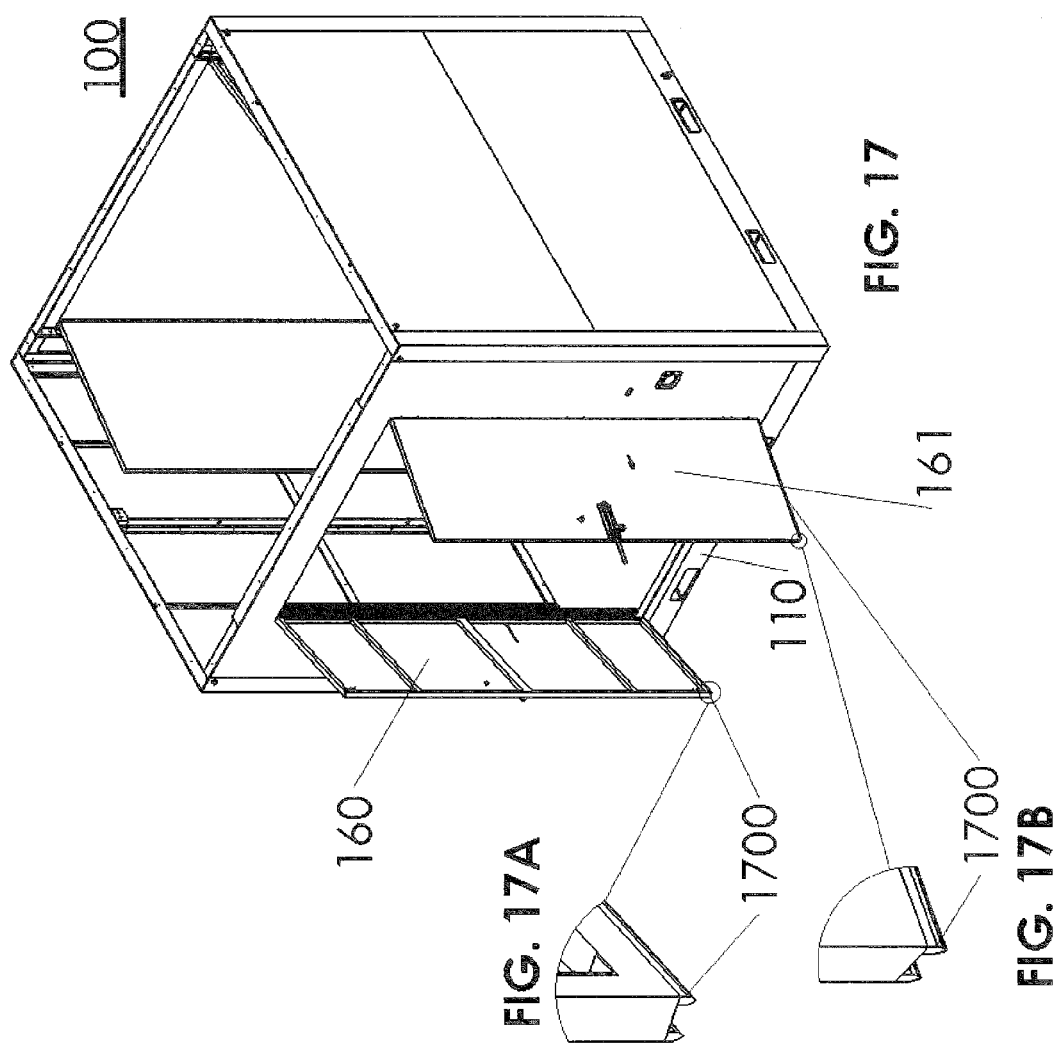

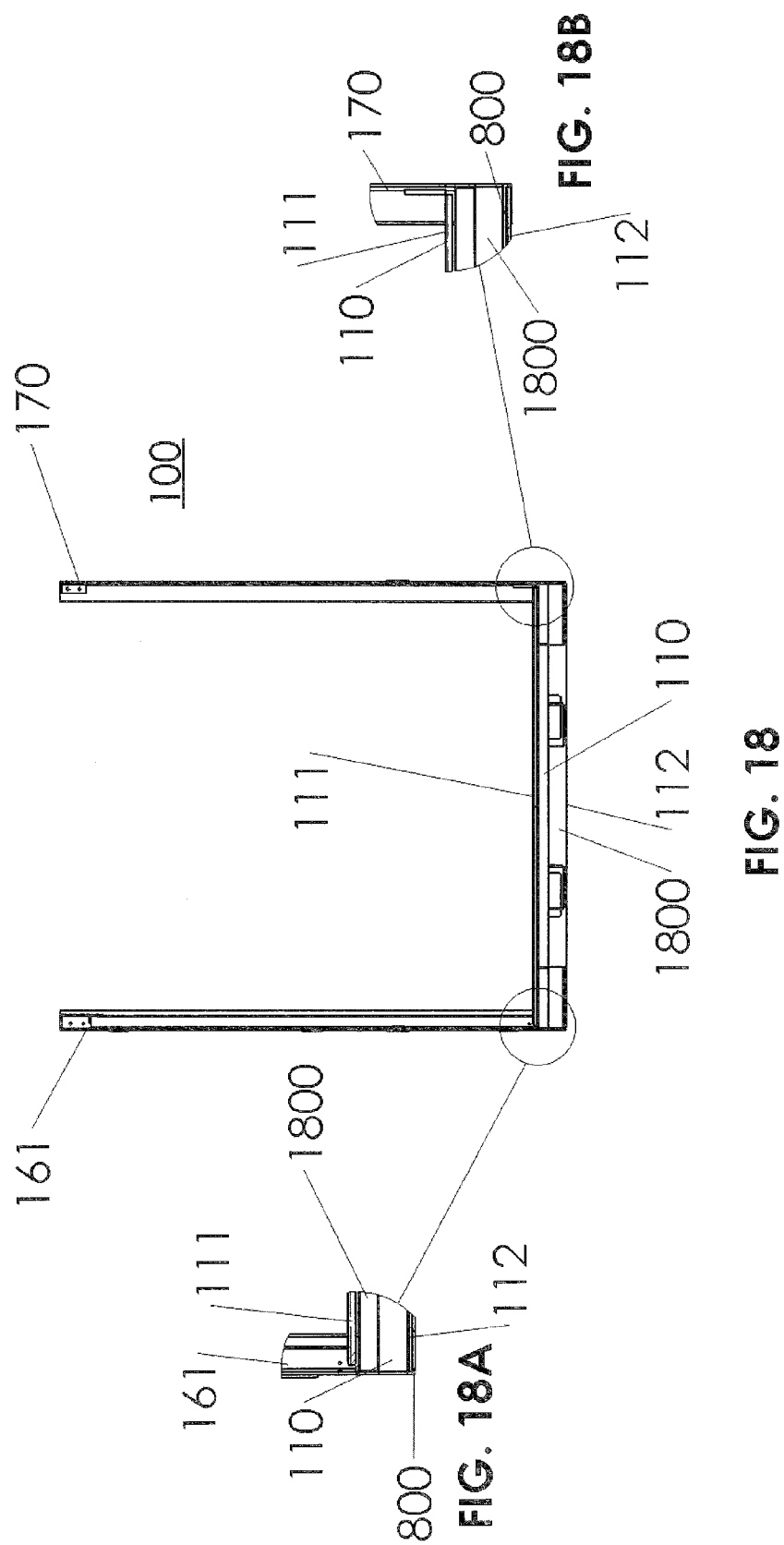

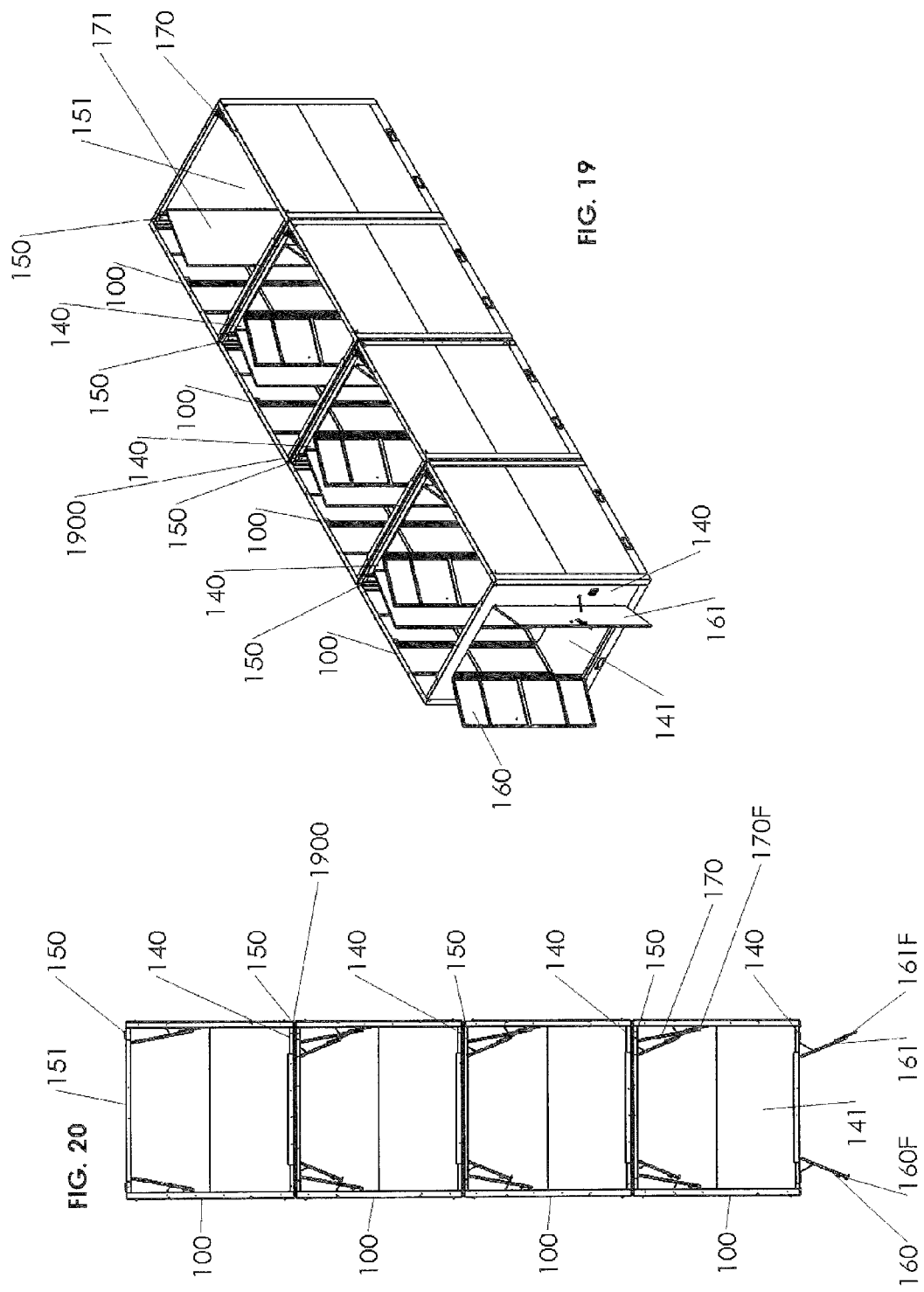

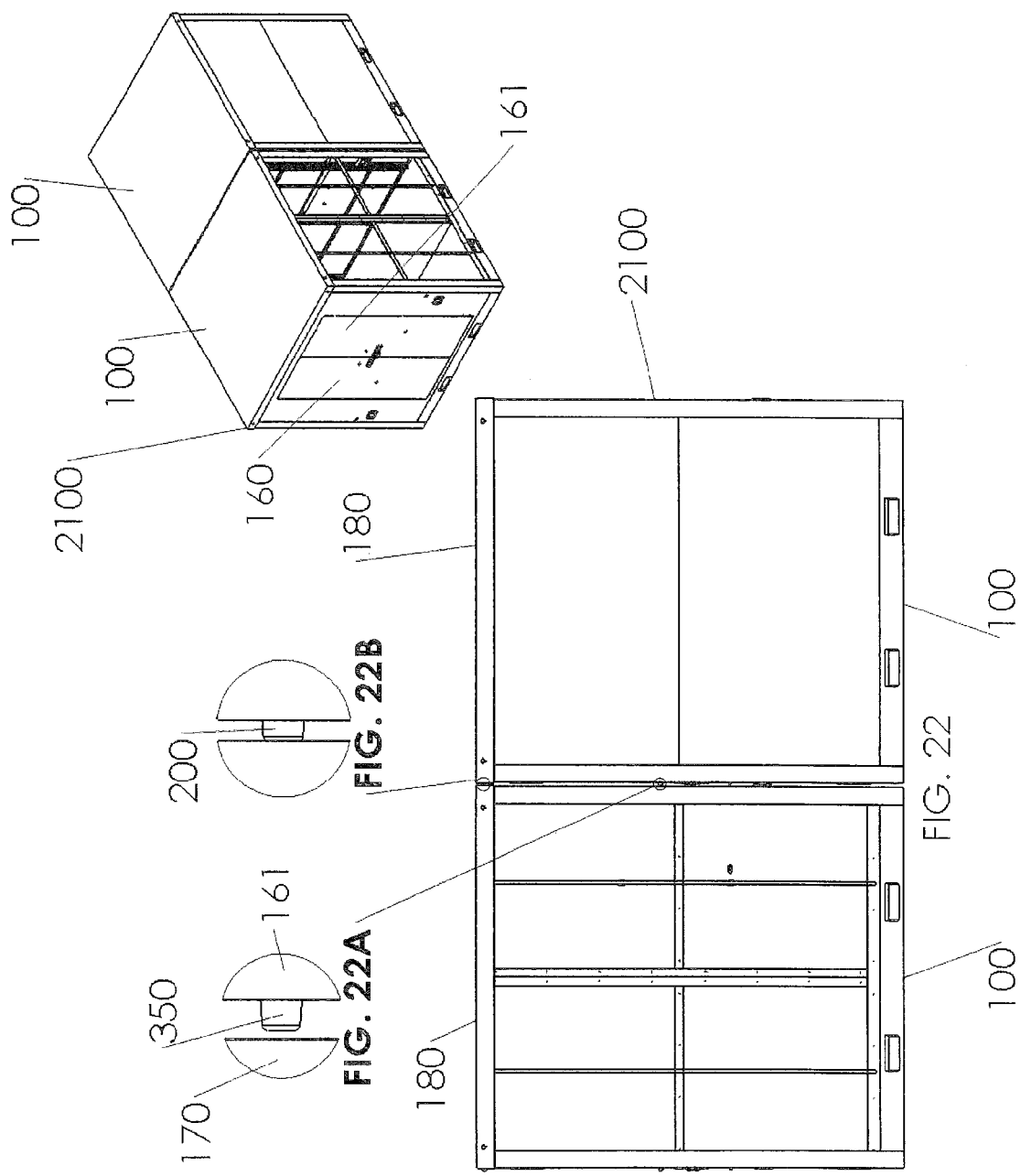

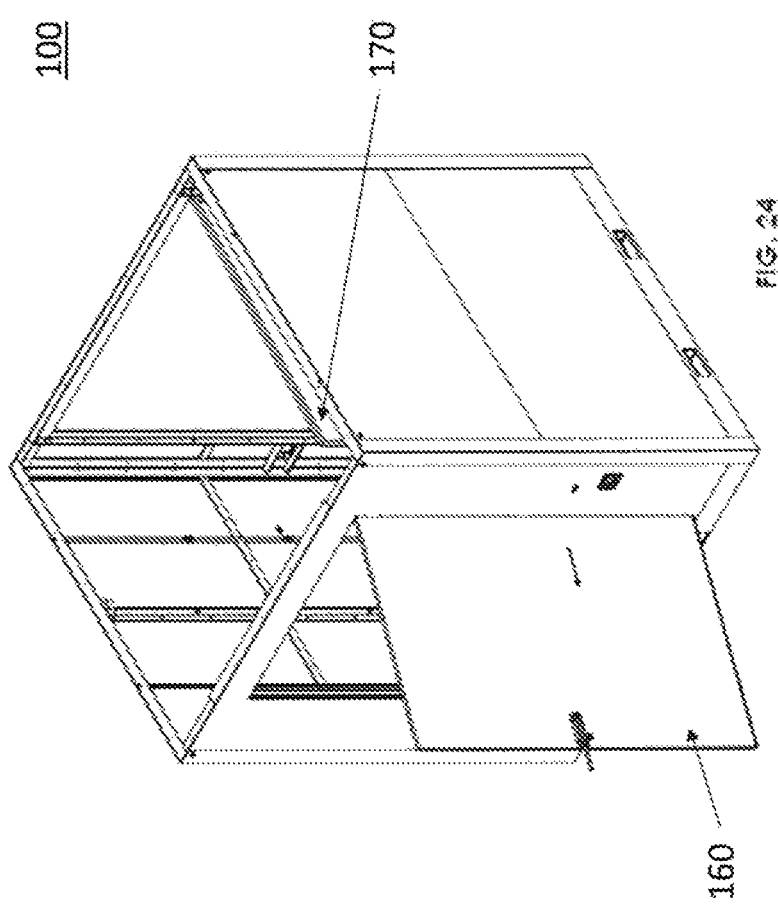

MODULAR SHIPPING CONTAINER HAVING HINGED DOORS, SYSTEM, AND METHOD

This application is a continuation-in-part of U.S. patent application Ser. No. 14/553,383, filed Nov. 25, 2014, and incorporated herein by reference.

FIELD OF THE APPLICATION

This application relates to the field of shipping containers, and more specifically, to a modular shipping container, system, and method.

BACKGROUND

The efficient, safe, and secure shipment of freight, such as goods, components, products, mail, etc. is an important aspect of business today. Freight is often shipped nationally and internationally by truck, train, ship, and airplane. Before the freight reaches its destination, it is often handled by several different entities, such as trucking companies, intermediate consolidators, railways, shipping companies, and airlines.

One problem with present systems and methods for shipping freight is that they typically involve the complex and inefficient transfer and repackaging of freight before it is received by end users. For example, items of freight are typically picked up by one entity and brought to a transfer point where the goods are consolidated with other freight into boxes or containers. These boxes and containers, often containing freight for a variety of different end users, are then shipped by land, sea, or air to another site where the items are unconsolidated, reloaded, and then delivered to the end users. Throughout this process, different entities have control of the freight which increases the likelihood of mishandling or error. This complex process results in inefficiency and added expense. It also increases the likelihood of damage to or loss of the freight as it is transported to the end user.

A need therefore exists for an improved shipping container, system, and method. Accordingly, a solution that addresses, at least in part, the above and other shortcomings is desired.

SUMMARY OF THE INVENTION

According to one aspect of the application, there is provided a modular shipping container, comprising: an enclosure having a base opposed and spaced from a roof, each of the base and roof coupled to respective ends of opposed and spaced left and right side walls and to opposed and spaced front and back walls, the front and back walls having front and back door openings formed therein, respectively; and, front doors and back doors mounted to the front and back walls, respectively, and operable to selectively open and close the front and back door openings; wherein the front door opening and the front doors are smaller than the back door opening and the back doors, respectively, whereby the front doors are openable at least ninety degrees through a back door opening-sized access.

BRIEF DESCRIPTION OF THE DRAWINGS

Features and advantages of the embodiments of the present application will become apparent from the following detailed description, taken in combination with the appended drawings, in which:

FIG. 1 is a front perspective view illustrating a modular shipping container in accordance with an embodiment of the application;

FIG. 1A is a detail view illustrating the roof bumpers shown in FIG. 1 in accordance with an embodiment of the application;

FIG. 1B is a detail view illustrating the door bumpers shown in FIG. 1 in accordance with an embodiment of the application;

FIG. 1C is a detail view illustrating the locking hasp and staple of the slide bolt latch for the front doors shown in FIG. 1 in accordance with an embodiment of the application;

FIG. 2 is a front view illustrating the modular shipping container of FIG. 1 in accordance with an embodiment of the application;

FIG. 3 is a rear view illustrating the modular shipping container of FIG. 1 in accordance with an embodiment of the application;

FIG. 4 is a right side view illustrating the modular shipping container of FIG. 1 in accordance with an embodiment of the application;

FIGS. 4A and 4B are detail views illustrating the roof and door bumpers shown in FIG. 4 in accordance with an embodiment of the application;

FIG. 8 is an additional front perspective view illustrating the modular shipping container of FIG. 1 in accordance with an embodiment of the application;

FIG. 8A is a detail view illustrating the rubber pads shown in FIG. 8 in accordance with an embodiment of the application;

FIG. 8B is a detail view illustrating the tie downs shown in FIG. 8 in accordance with an embodiment of the application;

FIG. 8C is a cross-sectional view taken along line A-A in FIG. 8B;

FIG. 9 is a broken-away rear perspective view illustrating the modular shipping container of FIG. 1 in accordance with an embodiment of the application;

FIGS. 9A and 9B are detail views illustrating the spring loaded locking pins for the left front door shown in FIG. 9 in accordance with an embodiment of the application;

FIG. 9C is a detail view illustrating the door bumper fasteners shown in FIG. 9 in accordance with an embodiment of the application;

FIG. 10 is a broken-away front perspective view illustrating the modular shipping container of FIG. 1 in accordance with an embodiment of the application;

FIG. 10A is a detail view illustrating the slide bolt latch for the front doors shown in FIG. 10 in accordance with an embodiment of the application;

FIG. 10B is a detail view illustrating the slide bolt latch for the back doors shown in FIG. 10 in accordance with an embodiment of the application;

FIGS. 10C and 10D are detail views illustrating the spring loaded locking pins for the back doors shown in FIG. 10 in accordance with an embodiment of the application;

FIG. 13 is a broken-away front perspective view illustrating the inner surface of the left side wall of the modular shipping container of FIG. 1 in accordance with an embodiment of the application;

FIG. 13A is a detail view illustrating the tie down rings shown in FIG. 13 in accordance with an embodiment of the application;

FIG. 14 is a front view illustrating the inner surface of the left side wall of the modular shipping container of FIG. 13 in accordance with an embodiment of the application;

FIG. 15 is a broken-away front perspective view illustrating the modular shipping container of FIG. 1 with the front doors and back doors in respective opened positions in accordance with an embodiment of the application;

FIG. 16 is a top view illustrating the modular shipping container of FIG. 15 in accordance with an embodiment of the application;

FIG. 17 is an additional broken-away front perspective view illustrating the modular shipping container of FIG. 1 with the front doors and back doors in respective opened positions in accordance with an embodiment of the application;

FIGS. 17A and 17B are detail views illustrating the rubber gaskets on the front doors shown in FIG. 17 in accordance with an embodiment of the application;

FIG. 18 is a partial cross-sectional view taken along line B-B in FIG. 10;

FIGS. 18A and 18B are detail views illustrating the base of the modular shipping container at the front and back doors shown in FIG. 18 in accordance with an embodiment of the application;

FIG. 19 is a broken-away side perspective view illustrating a shipping container system including four modular shipping containers positioned front wall to back wall in accordance with an embodiment of the application;

FIG. 20 is a top view illustrating the shipping container system of FIG. 19 in accordance with an embodiment of the invention;

FIG. 21 is a broken-away side perspective view illustrating a shipping container system including two modular shipping containers positioned front wall to back wall in accordance with an embodiment of the application;

FIG. 22 is a side view illustrating the shipping container system of FIG. 21 in accordance with an embodiment of the invention;

FIGS. 22A and 22B are detail views illustrating the roof and door bumpers shown in FIG. 21 in accordance with an embodiment of the application; and, FIG. 23 is a side perspective view illustrating a shipping container system including six modular shipping containers positioned side wall to side wall and mounted on a trailer in accordance with an embodiment of the application.

FIG. 24 is a front perspective view illustrating an embodiment of the modular shipping container with the front door and back door in opened positions.

It will be noted that throughout the appended drawings, like features are identified by like reference numerals.

DETAILED DESCRIPTION OF THE EXAMPLE EMBODIMENTS

In the following description, details are set forth to provide an understanding of the application. In some instances, certain structures, techniques and methods have not been described or shown in detail in order not to obscure the application.

Figure 5:
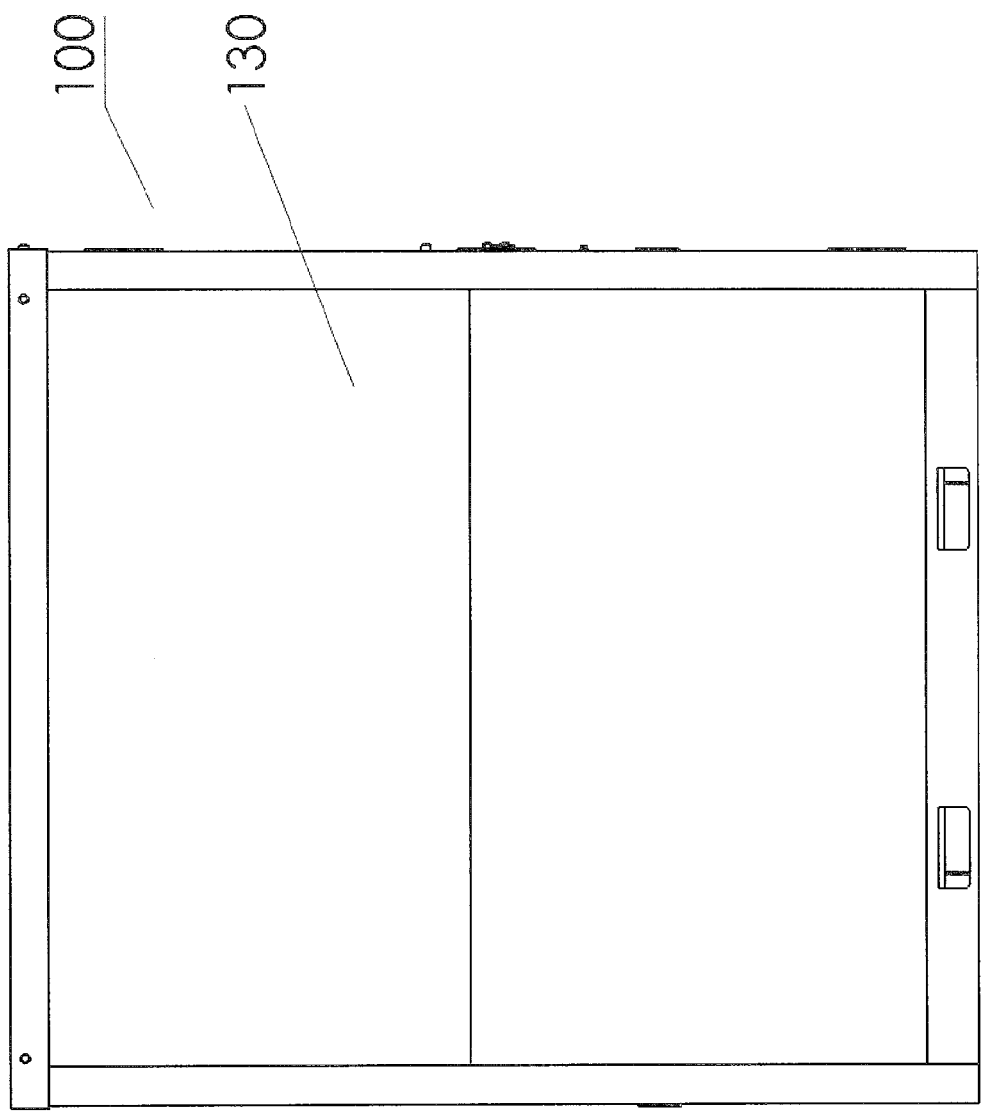
FIG. 5 is a left side view illustrating the modular shipping container of FIG. 1 in accordance with an embodiment of the application.
Figure 6:
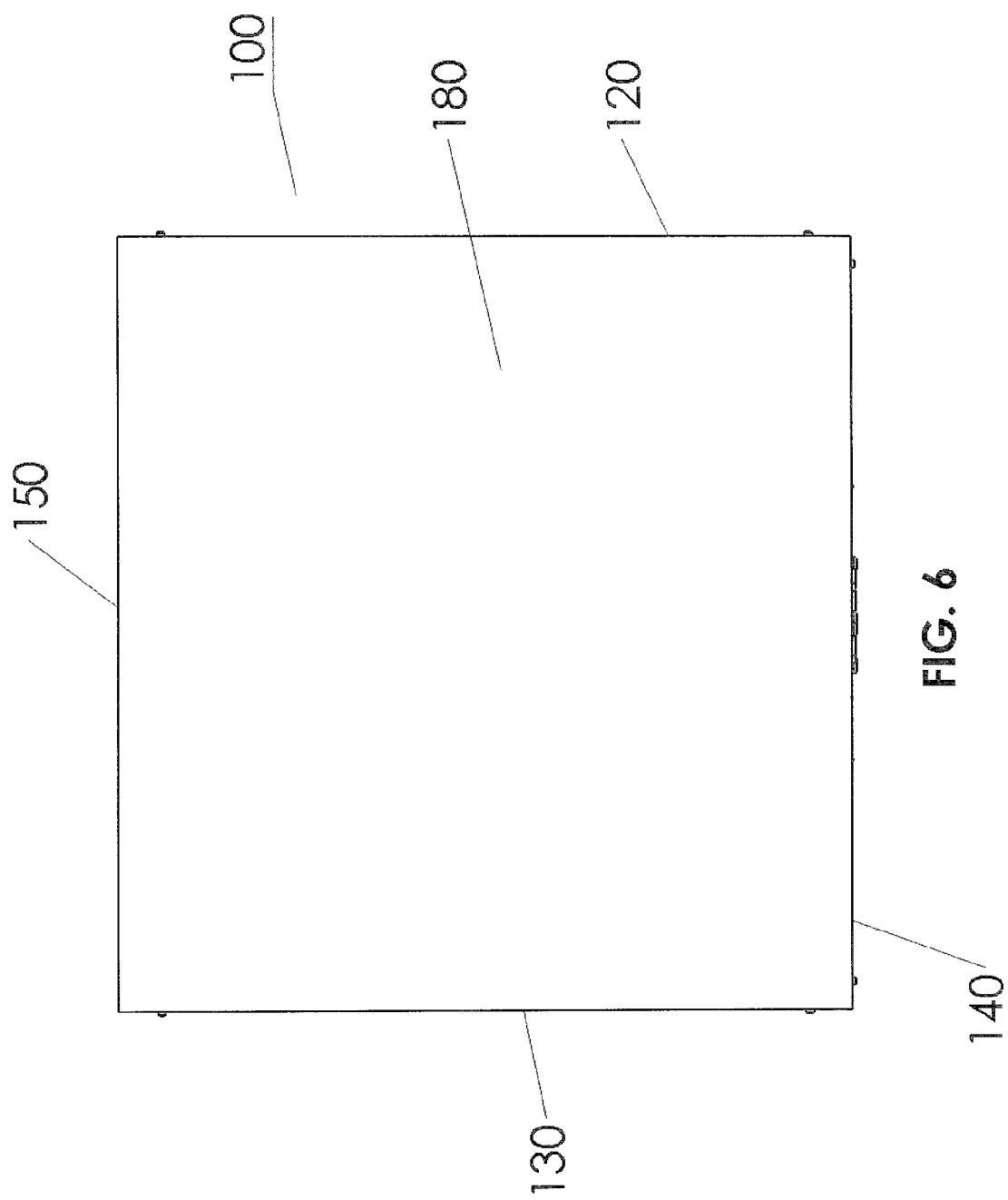
FIG. 6 is a top view illustrating the modular shipping container of FIG. 1 in accordance with an embodiment of the application.
Figure 7:
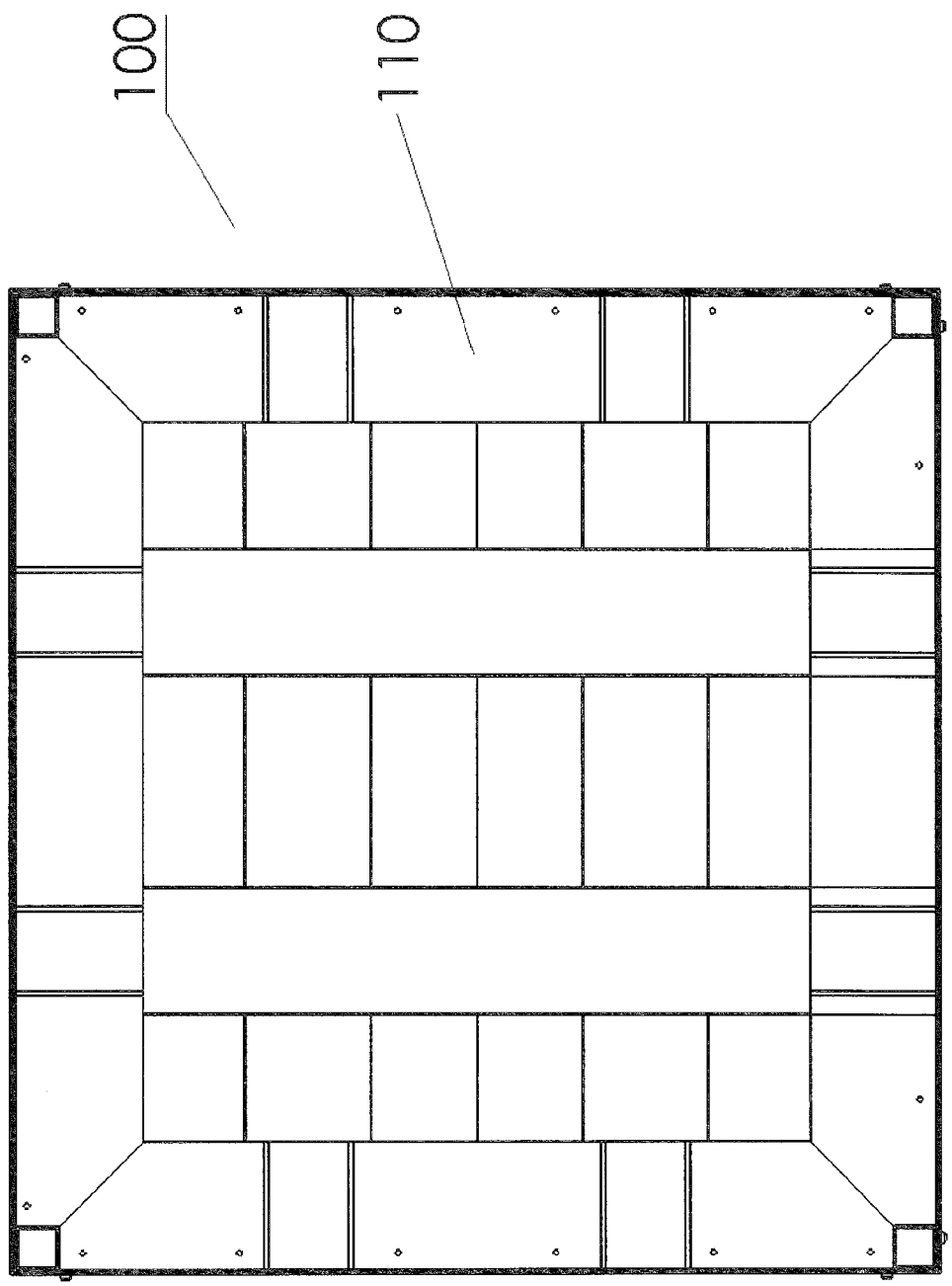
FIG. 7 is a bottom view illustrating the modular shipping container of FIG. 1 in accordance with an embodiment of the application.

FIG. 1 is a front perspective view illustrating a modular shipping container 100 in accordance with an embodiment of the application. FIG. 2 is a front view illustrating the modular shipping container 100 of FIG. 1 in accordance with an embodiment of the application. FIG. 3 is a rear view illustrating the modular shipping container 100 of FIG. 1 in accordance with an embodiment of the application. FIG. 4 is a right side view illustrating the modular shipping container 100 of FIG. 1 in accordance with an embodiment of the application. FIG. 5 is a left side view illustrating the modular shipping container 100 of FIG. 1 in accordance with an embodiment of the application. FIG. 6 is a top view illustrating the modular shipping container 100 of FIG. 1 in accordance with an embodiment of the application. And, FIG. 7 is a bottom view illustrating the modular shipping container 100 of FIG. 1 in accordance with an embodiment of the application.

According to one embodiment, the modular shipping container (or shipping container or container) 100 includes: a base 110; opposed right and left side walls (or first and second side walls) 120, 130 coupled (or joined or fastened) to the base 110; opposed front and back walls (or first and second end walls) 140, 150 coupled to the base 110, the front and back walls 140, 150 having front and back door openings (or first and second openings) 141, 151 formed therein (see FIG. 15), respectively, for the loading and removal of freight (not shown) from the shipping container 100; a roof 180 coupled to the right and left side walls 120, 130 and to the front and back walls 140, 150; and, a double front door having left and right front doors (or door leaves or panels) 160, 161 and a double back door having left and right back doors 170, 171 (or door leaves or panels) sized for mounting to the front and back walls 140, 150, respectively, to selectively close the front and back door openings 141, 151 to secure the freight within the shipping container 100. The front door opening 141 and the front doors 160, 161 may be sized smaller than the back door opening 151 and the back doors 170, 171, respectively, to allow the front doors 160, 161 to be opened at least 90 degrees through the back door opening 151 of an adjacent container 100 (see FIGS. 19-20).

The modular shipping container 100 may be used for transporting and storing freight which may be placed on the upper surface 111 or floor 114 of the base 110 within the volume 190 or enclosure 191 defined by the base 110, side walls 120, 130, end walls 140, 150, and roof 180 (i.e., inside 190 the shipping container 100). According to one embodiment, the shipping container 100 may be constructed using wood, plastic, fibreglass, and/or metal.

The front wall 140 of the shipping container 100 may be rectangular in shape having an inner surface 142 facing the inside 190 of the container 100 and an outer surface 144 facing the outside 200. Similarly, the front doors 160, 161 may be rectangular in shape each having a respective inner surface 160A, 161A facing the inside 190 of the container 100 and a respective outer surface 160B, 161B facing the outside 200. Similarly, the front door opening 141 (see FIG. 15) may be rectangular in shape. According to other embodiments, the front doors 160, 161 and front door opening 141 may be square in shape, circular in shape, or any other shape.

The front doors 160, 161 are hinge 160C, 161C (or pivot) mounted to door jambs formed in or attached to the front wall 140 at respective sides of the front door opening 141 and operate (e.g., swing or pivot) to close the front door opening 141 from outside 200 the shipping container 100.

The front doors 160, 161 are secured or locked in place over the front door opening 141 using one or more slide bolt latches 300 (e.g., one slide bolt latch) mounted between the front doors 160, 161 along the respective border or outer edge 160D, 161D of the outer surface 160B, 161B of each front door 160, 161 (e.g., on the lock rail at the outer stile). The bolt 310 of each slide bolt latch 300 mounted on the outer surface 161B of the right front door 161 (for example) engages a respective strike plate or hole 320 mounted on or formed in the outer surface 160B of the left front door 160 (for example) adjacent each slide bolt latch 300. A user or users may open and close the front doors 160, 161 using the slide bolt latch 300. The slide bolt latch 300 may be equipped with a locking hasp and staple 330 for receiving a padlock, for example.

Note that FIGS. 1 to 10 and 21 to 23 show the front doors 160, 161 in their closed positions 160E, 161E and the back doors 170, 171 in their closed positions 170E, 171E. And, FIGS. 15 to 17 and 19 to 20 show the front doors 160, 161 in their opened positions 160F, 161F and the back doors 170, 171 in their opened positions 170F, 171F.

FIG. 1A is a detail view illustrating the roof bumpers 200 shown in FIG. 1 in accordance with an embodiment of the application. FIG. 1B is a detail view illustrating the door bumpers 350 shown in FIG. 1 in accordance with an embodiment of the application. FIGS. 4A and 4B are detail views illustrating the roof and door bumpers 200, 350 shown in FIG. 4 in accordance with an embodiment of the application. And, FIGS. 22A and 22B are detail views illustrating the roof and door bumpers 200, 350 shown in FIG. 21 in accordance with an embodiment of the application. The walls of the roof 180 or the walls 120, 130, 140, 150 proximate the roof 180 may be equipped with one or more roof bumpers 200 (e.g., rubber bumpers) to protect the walls 120, 130, 140, 150 of the container 100 from potential damage due to contact with adjacent containers 100 or other objects or surfaces. In addition, the front doors 160, 161 may be equipped with one or more door bumpers 350 (e.g., rubber bumpers) mounted on the outer surface 160B, 161B of each front door 160, 161 to protect the front doors 160, 161 from potential damage due to contact with the back doors 170, 171 of an adjacent container 100.

FIG. 8 is an additional front perspective view illustrating the modular shipping container 100 of FIG. 1 in accordance with an embodiment of the application. FIG. 8A is a detail view illustrating the rubber pads 800 shown in FIG. 8 in accordance with an embodiment of the application. FIG. 8B is a detail view illustrating the tie downs 380 shown in FIG. 8 in accordance with an embodiment of the application. And, FIG. 8C is a cross-sectional view taken along line A-A in FIG. 8B. One or more D-rings or tie downs 380 may be mounted on the outer surfaces 144, 154 of the front and back walls 140, 150 of the shipping container 100 to provide a means of securing the shipping container 100 to a trailer, ship hold, etc., and/or to another shipping container 100 as described below. In addition, one or more rubber pads 800 may be mounted to the underside 112 of the base 110 at the corners 113 to protect the base 110 from potential damage due to contact with rough surfaces or other objects and to reduce damage to surfaces on which the shipping container 100 may be positioned.

FIG. 9 is a broken-away rear perspective view illustrating the modular shipping container 100 of FIG. 1 in accordance with an embodiment of the application. FIGS. 9A and 9B are detail views illustrating the spring loaded locking pins 900 for the left front door 160 shown in FIG. 9 in accordance with an embodiment of the application. And, FIG. 9C is a detail view illustrating the door bumper fasteners 351 shown in FIG. 9 in accordance with an embodiment of the application. The left front door 160, for example, may be equipped with spring loaded locking pins 900 mounted at the top and bottom of the door 160 (e.g., on the outer stile) for engaging the front wall 140 or front door lintel and the base 110 or front door sill, respectively, to selectively lock or secure the front door 160 in its closed position 160E from inside 190 the container 100. In addition, the door bumpers 350 shown in FIG. 1 may be secured to the front doors 160, 161 on their inner surfaces 160A, 161A using a respective cap nut 3511 and lock washer 3512 or other fastener 351.

FIG. 10 is a broken-away front perspective view illustrating the modular shipping container 100 of FIG. 1 in accordance with an embodiment of the application. FIG. 10A is a detail view illustrating the slide bolt latch 300 for the front doors 160, 161 shown in FIG. 10 in accordance with an embodiment of the application. FIG. 1C is a detail view illustrating the locking hasp and staple 330 of the slide bolt latch 330 for the front doors 160, 161 shown in FIG. 1 in accordance with an embodiment of the application. FIG. 10B is a detail view illustrating the slide bolt latch 300 for the back doors 170, 171 shown in FIG. 10 in accordance with an embodiment of the application. And, FIGS. 10C and 10D are detail views illustrating the spring loaded locking pins 900 for the back doors 170, 171 shown in FIG. 10 in accordance with an embodiment of the application.

The back wall 150 may be rectangular in shape having an inner surface 152 facing the inside 190 the container 100 and an outer surface 154 facing the outside 200. Similarly, the back doors 170, 171 may be rectangular in shape each having a respective inner surface 170A, 171A facing the inside 190 of the container 100 and a respective outer surface 170B, 171B facing the outside 200. Similarly, the back door opening 151 (see FIG. 15) may be rectangular in shape. According to other embodiments, the back doors 170, 171 and back door opening 151 may be square in shape, circular in shape, or any other shape.

The back doors 170, 171 are hinge 170C, 171C (or pivot) mounted to door jambs formed in or attached to the back wall 150 at respective sides of the back door opening 151 and operate (e.g., swing or pivot) to close the back door opening 151 from inside 190 the shipping container 100.

The back doors 170, 171 are secured or locked in place over the back door opening 151 using one or more slide bolt latches 300 (e.g., one slide bolt latch) mounted between the back doors 170, 171 along the respective border or outer edge 170D, 171D of the inner surface 170B, 171B of each back door 170, 171 (e.g., on the lock rail at the outer stile). The bolt 310 of each slide bolt latch 300 mounted on the inner surface 170B of the left back door 170 (for example) engages a respective strike plate or hole 320 mounted on or formed in the inner surface 171B of the right back door 161 (for example) adjacent each slide bolt latch 300. A user or users may open and close the back doors 170, 171 using the slide bolt latch 300.

The back doors 170, 171 may be equipped with spring loaded locking pins 900 mounted at the top and bottom of each door 170, 171 (e.g., on the outer stile) for engaging the back wall 150 or back door lintel and the base 110 or back door sill, respectively, to selectively lock or secure the back doors 170, 171 in their closed positions 170E, 171E from inside 190 the container 100.

Figure 12:
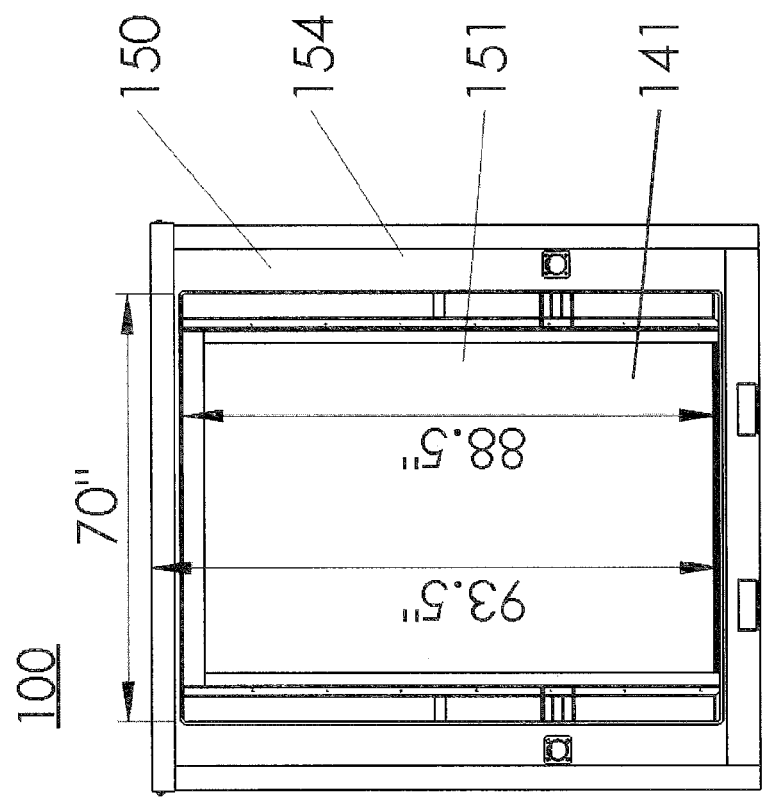
FIG. 12 is a rear view illustrating the modular shipping container of FIG. 1 with the front doors and back doors removed in accordance with an embodiment of the application.
Figure 11:
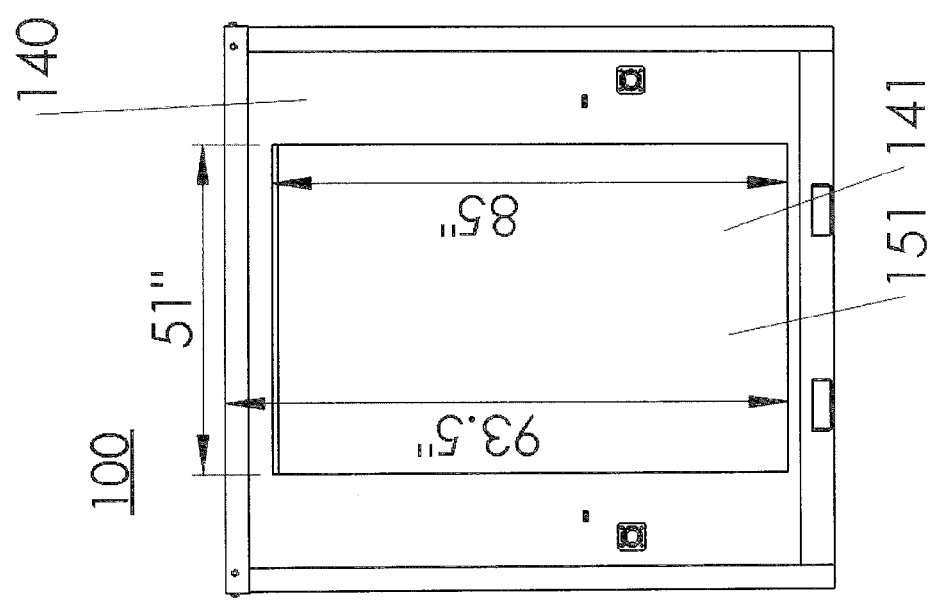
FIG. 11 is a front view illustrating the modular shipping container of FIG. 1 with the front doors and back doors removed in accordance with an embodiment of the application.

FIG. 11 is a front view illustrating the modular shipping container 100 of FIG. 1 with the front doors 160, 161 and back doors 170, 171 removed in accordance with an embodiment of the application. And, FIG. 12 is a rear view illustrating the modular shipping container 100 of FIG. 1 with the front doors 160, 161 and back doors 170, 171 removed in accordance with an embodiment of the application. According to one embodiment, the front door opening 141 may be 54 inches wide by 85 inches high while the back door opening 151 may be 70 inches wide by 88.5 inches high. FIGS. 11 and 12 show the nesting of the front door opening 141 within the back door opening 151. This nesting allows the front doors 160, 161 of a container 100 to open at least 90 degrees through the open back doors 170, 171 of an adjacent container 100 as shown in FIGS. 19 and 20.

FIG. 13 is a broken-away front perspective view illustrating the inner surface 130A of the left side wall 130 of the modular shipping container 100 of FIG. 1 in accordance with an embodiment of the application. FIG. 13A is a detail view illustrating the tie down rings 1300 shown in FIG. 13 in accordance with an embodiment of the application. And, FIG. 14 is a front view illustrating the inner surface 130A of the left side wall 130 of the modular shipping container 100 of FIG. 13 in accordance with an embodiment of the application. The inner surface (e.g., 130A) of each side wall (e.g., 130) may be equipped with one or more tie down rings 1300 (e.g., four tie down rings) for securing freight within the shipping container 100. These tie down rings 1300 may be used to position freight within the shipping container 100 so as to face the front doors 160, 161.

FIG. 15 is a broken-away front perspective view illustrating the modular shipping container 100 of FIG. 1 with the front doors 160, 161 and back doors 170, 171 in respective opened positions 160F, 161F, 170F, 171F in accordance with an embodiment of the application. And, FIG. 16 is a top view illustrating the modular shipping container 100 of FIG. 15 in accordance with an embodiment of the application. Each front door 160, 161 may be equipped with a door holder 1600 having a post 1610 (e.g., a folding post) mounted on the outer surface 160B, 161B of the door 160, 161 and a keeper 1620 mounted on the front wall 140 adjacent to the door 160, 161. Similarly, each back door 170, 171 may be equipped with a door holder 1600 having the post 1610 mounted on the inner surface 170A, 171A of the door 170, 171 and the keeper 1620 mounted on the inner surface 130A of the side wall 130 adjacent to the door 170, 171. When respective posts 1610 are inserted in respective keepers 1620, the door holders 1600 operate to selectively hold the doors 160, 161, 170, 171 in their opened positions 160F, 161F, 170F, 171F.

FIG. 17 is an additional broken-away front perspective view illustrating the modular shipping container 100 of FIG. 1 with the front doors 160, 161 and back doors 170, 171 in respective opened positions 160F, 161F, 170F, 171F in accordance with an embodiment of the application. And, FIGS. 17A and 17B are detail views illustrating the rubber gaskets 1700 mounted on the front doors 160, 161 shown in FIG. 17 in accordance with an embodiment of the application. A rubber gasket 1700 or sweep may be mounted over or along the bottom edge or rail of each front door 160, 161 to seal the front doors 160, 161 at the base 110 when in their closed positions 160E, 161E.

FIG. 18 is a partial cross-sectional view taken along line B-B in FIG. 10. And, FIGS. 18A and 18B are detail views illustrating the base 110 of the modular shipping container 100 at the front and back doors 160, 161, 170, 171 shown in FIG. 18 in accordance with an embodiment of the application.

The base 110 may include a floor 114 (e.g., a plywood floor) mounted on a bottom skid 1800 which serves to strengthen the base 110 and allow the shipping container 100 to be transported or moved by a forklift. A top skid 1850 may be mounted on the outer surface 184 of the roof 180 to protect the shipping container 100 when it is stacked. According to one embodiment, at least the outer surface 184 of the roof 180 may be covered with a waterproof skin or coating.

FIG. 19 is a broken-away side perspective view illustrating a shipping container system 1900 including four modular shipping containers 100 positioned front wall 140 to back wall 150 in accordance with an embodiment of the application. FIG. 20 is a top view illustrating the shipping container system 1900 of FIG. 19 in accordance with an embodiment of the invention. FIG. 21 is a broken-away side perspective view illustrating a shipping container system 2100 including two modular shipping containers 100 positioned front wall 140 to back wall 150 in accordance with an embodiment of the application. FIG. 22 is a side view illustrating the shipping container system 2100 of FIG. 21 in accordance with an embodiment of the invention. And, FIGS. 22A and 22B are detail views illustrating the roof and door bumpers 200, 350 shown in FIG. 21 in accordance with an embodiment of the application.

Multiple shipping containers 100 may be placed or positioned front wall 140 to back wall 150 to form a shipping container system 1900, 2100. The front doors 160, 161 of each shipping container 100 are narrow enough to open inside the open back doors 170, 171 of the adjacent shipping container 100 even if the shipping containers 100 forming the system 1900, 2100 are misaligned. According to one embodiment, the multiple shipping containers 100 forming the shipping container system 1900, 2100 may be coupled together.

The shipping container system 1900, 2100 may be mounted on a trailer 2310 (see FIG. 23) or within a larger shipping container. Because the front doors 160, 161 of each shipping container 100 are narrow enough to open (e.g., at least 90 degrees) inside the open back doors 170, 171 of the adjacent shipping container 100 even if the shipping containers 100 forming the system 1900, 2100 are misaligned, the shipping containers 100 may be loaded or emptied one after the other when installed on a trailer 2310 or within a larger shipping container using a single point of access (e.g., a single front door opening 141). For example, a standard 53 foot trailer may hold up to seven shipping containers 100 and a user may open all container doors 160, 161, 170, 171 and travel from end to end of the trailer 2310 within the shipping containers 100.

In operation, access to each shipping container 100 in the shipping container system 1900, 2100 for loading and unloading freight may be gained by opening the front doors 160, 161 of a following shipping container 100 through the opened back doors 170, 171 of a leading shipping container 100.

Figure 23:
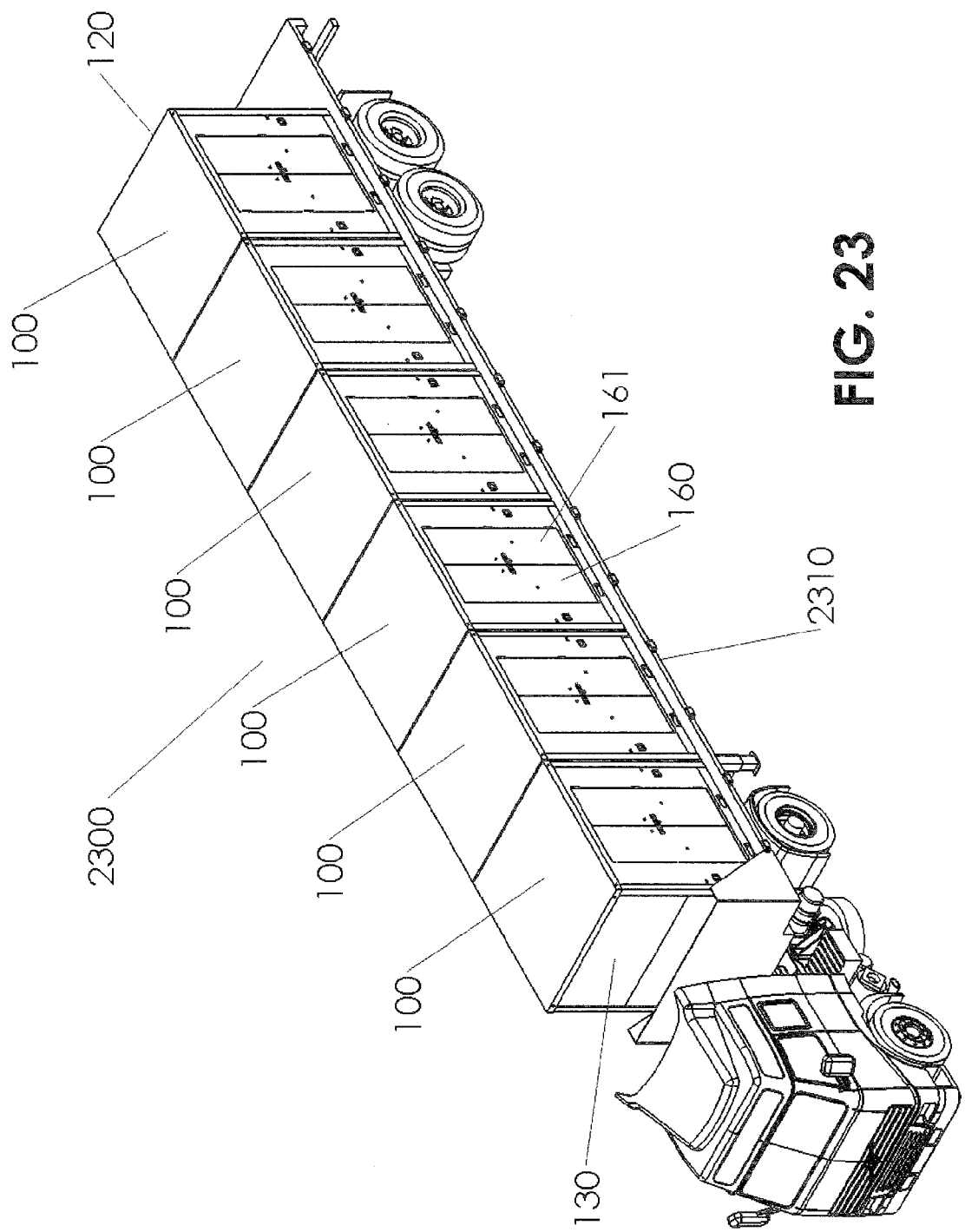

FIG. 23 is a side perspective view illustrating a shipping container system 2300 including six modular shipping containers 100 positioned side wall 120 to side wall 130 and mounted on a trailer 2310 in accordance with an embodiment of the application. According to one embodiment, a shipping container system 2300 may also be formed by mounting multiple shipping containers 100 side wall 120 to side wall 130 on a trailer 2310. In this system 2300, shipping containers 100 are aligned with front doors facing one side of the trailer 2310 and may be loaded from the ground. The trailer 2310 may be a standard flatbed trailer or a standard flatbed truck. According to one embodiment, the multiple shipping containers 100 forming the shipping container system 2300 may be coupled together.

According to one embodiment, rather than having two front doors 160, 161 (i.e., a double front door), the shipping container 100 may be equipped with one large front door (i.e., a single-leaf front door). Similarly, according to one embodiment, rather than having two back doors 170, 171 (i.e., a double back door), the shipping container 100 may be equipped with one large back door (i.e., a single-leaf back door).

According to one embodiment, the shipping containers 100 may be stacked (e.g., up to three container's high).

Thus, according to one embodiment, there is provided a modular shipping container 100, comprising: an enclosure 191 having a base 110 opposed and spaced from a roof 180, each of the base 110 and roof 180 coupled to respective ends of opposed and spaced left and right side walls 130, 120 and to opposed and spaced front and back walls 140, 150, the front and back walls 140, 150 having front and back door openings 141, 151 formed therein, respectively; and, front doors 160, 161 and back doors 170, 171 mounted to the front and back walls 140, 150, respectively, and operable to selectively open and close the front and back door openings 141, 151; wherein the front door opening 141 and the front doors 160, 161 are smaller than the back door opening 151 and the back doors 170, 171, respectively, whereby the front doors 160, 161 are openable at least ninety degrees through a back door opening-sized access (e.g., an access such as the back door opening 151 of an adjacent container 100).

The above embodiments may contribute to an improved modular shipping container 100 and may provide one or more advantages. First, to increase freight capacity, a number of modular shipping containers 100 may be positioned, placed, or coupled front wall 140 to back wall 150 to form a modular shipping container system 1900, 2100. Second, freight may be loaded and removed from the modular shipping container system 1900, 2100 by opening the front doors 160, 161 of just the first modular shipping container 100 in the system 1900, 2100.

The embodiments of the application described above are intended to be examples only. Those skilled in this art will understand that various modifications of detail may be made to these embodiments, all of which come within the scope of the application.

What is claimed is:

1. A modular shipping container, comprising:
    an enclosure having a base opposed and spaced from a roof, each of the base and roof coupled to respective ends of opposed and spaced left and right side walls and to opposed and spaced front and back walls, the front and back walls having front and back door openings formed therein, respectively;
    said front door opening having a front door opening width measured from a left side to a right side of the front door opening, and having a front door opening height measured from a top to a bottom of the front door opening;
    said back door opening having a back door opening width measured from a left side to a right side of the back door opening, and having a back door opening height measured from a top to a bottom of the back door opening;
    front doors and back doors mounted to the front and back walls, respectively, and operable to selectively open and close the front and back door openings;
    said front doors having a front door height measured from a top to a bottom of the front doors, and said back doors having a back door height measured from a top to a bottom of the back doors, the front door height being smaller than the back door height;
    wherein the front door opening width is smaller than the back door opening width, wherein the front door opening height is smaller than the back door opening height, and wherein the front wall is fixed in position relative to the base such that the front door opening height is a fixed dimension; and
    wherein the front door opening and the front doors are accordingly smaller than the back door opening and the back doors, and whereby the front doors are openable at least ninety degrees relative to said front door opening, and openable through a back door opening-sized access.

2. The modular shipping container of claim 1, wherein the front doors and the back doors are hinge mounted in the front door opening and the back door opening, respectively.

3. The modular shipping container of claim 1, wherein the front doors include at least one latch installed thereon for locking said front doors in a closed position, and wherein the at least one latch is operable from outside the modular shipping container only, and wherein the at least one latch is configured to be operated to open and close the front door opening from outside the modular shipping container only.

4. The modular shipping container of claim 1, wherein the back doors include at least one latch installed thereon for locking said back doors in a closed position, and wherein the at least one latch is operable from inside the modular shipping container only, and wherein the at least one latch is configured to be operated to open and close the back door opening from inside the modular shipping container only.

5. The modular shipping container of claim 1, wherein the front door opening and the back door opening are for the loading and removal of freight from within the modular shipping container.

6. The modular shipping container of claim 5, wherein the front doors and the back doors selectively close the front door opening and the back door opening, respectively, to secure the freight within the modular shipping container.

7. The modular shipping container of claim 5, wherein the shipping container is used for at least one of transporting and storing the freight.

8. The modular shipping container of claim 5, wherein the freight is stored on an upper surface or floor of the base within the modular shipping container.

9. A modular shipping container system, comprising:
    a first shipping container having a first front wall to which first front doors are mounted in a first front door opening formed therein and a first back wall to which first back doors are mounted in a first back door opening formed therein;
    a second shipping container having a second front wall to which second front doors are mounted in a second front door opening formed therein and a second back wall to which second back doors are mounted in a second back door opening formed therein;
    said first front door opening having a first front door opening width measured from a left side to a right side of the first front door opening, and having a first front door opening height measured from a top to a bottom of the first front door opening;

said first back door opening having a first back door opening width measured from a left side to a right side of the first back door opening, and having a first back door opening height measured from a top to a bottom of the first back door opening;

said second front door opening having a second front door opening width measured from a left side to a right side of the second front door opening, and having a second front door opening height measured from a top to a bottom of the second front door opening, and said second back door opening having a second back door opening width measured from a left side to a right side of the second back door opening, and having a second back door opening height measured from a top to a bottom of the second back door opening;

wherein the respective first and second front door opening heights are a fixed dimension;

wherein the respective first and second front doors have a front door height measured from a top to a bottom of the front doors, and the respective first and second back doors have a back door height measured from a top to a bottom of the back doors, the front door height being smaller than the back door height;

wherein the first back wall is positioned adjacent to the second front wall; and wherein the second front door opening has a smaller second front width and a smaller second front height than the first back width and the first back height of said first back door opening, respectively, and the second front doors are each accordingly smaller than each of the first back door opening and the first back doors, whereby the second front doors are openable at least ninety degrees relative to said second front door opening, and openable through the first back door opening.

10. The system of claim 9, wherein the first and second shipping containers are mounted on a trailer.

11. A method for storing freight, comprising:
positioning a first shipping container adjacent to a second shipping container;

wherein the first shipping container has a first front wall to which first front doors are mounted in a first front door opening formed therein and a first back wall to which first back doors are mounted in a first back door opening formed therein;

wherein the second shipping container has a second front wall to which second front doors are mounted in a second front door opening formed therein and a second back wall to which second back doors are mounted in a second back door opening formed therein;

said first front door opening having a first front door opening width measured from a left side to a right side of the first front door opening, and having a first front door opening height measured from a top to a bottom of the first front door opening;

said first back door opening having a first back door opening width measured from a left side to a right side of the first back door opening, and having a first back door opening height measured from a top to a bottom of the first back door opening;

said second front door opening having a second front door opening width measured from a left side to a right side of the second front door opening, and having a second front door opening height measured from a top to a bottom of the second front door opening, and said second back door opening having a second back door opening width measured from a left side to a right side of the second back door opening, and having a second back door opening height measured from a top to a bottom of the second back door opening;

wherein the respective first and second front door opening heights are a fixed dimension;

wherein the respective first and second front doors have a front door height measured from a top to a bottom of the front doors, and the respective first and second back doors have a back door height measured from a top to a bottom of the back doors, the front door height being smaller than the back door height;

wherein the first back wall is positioned adjacent to the second front wall;

wherein the second front door opening has a smaller second front width and a smaller second front height than the first back width and the first back height of said first back door opening, respectively, and the second front doors are each accordingly smaller than each of the first back door opening and the first back doors; and whereby the second front doors are openable at least ninety degrees relative to said second front door opening, and openable through the first back door opening; and, accessing the freight stored in the second shipping container through the first shipping container.

12. The method of claim 11, wherein the first and second front doors further comprise at least one latch installed on each of said first and second front doors for locking said doors in a closed position, and wherein said latches are operable from outside the modular shipping container only, and wherein the first and second back doors further comprise at least one latch installed on each of said first and second back doors for locking said back doors in a closed position, and wherein said latches are operable from inside the respective shipping containers only.

13. A shipping container, comprising:
an enclosure having opposed first and second walls, the first and second walls having first and second openings formed therein, respectively; and, said first opening having a first opening width measured from a left side to a right side of the first opening, and having a first opening height measured from a top to a bottom of the first opening;

said second opening having a second opening width measured from a left side to a right side of the second opening, and having a second opening height measured from a top to a bottom of the second opening;

first doors and second doors for the first and second openings, respectively;

said first doors having a first door height measured from a top to a bottom of the first doors, and said second doors having a second door height measured from a top to a bottom of the second doors, the first door height being smaller than the second door height;

wherein the first opening width is smaller than the second opening width, wherein the first opening height is smaller than the second opening height, and wherein the first opening height is a fixed dimension; and the first doors are accordingly smaller than each of the second opening and the second doors, whereby the first doors are openable at least ninety degrees relative to said first opening, and openable through a second opening-sized access.

* * * * *